June 30, 1964     A. M. UTTLEY     3,138,955
FLUID MEASURING APPARATUS
Filed May 8, 1961
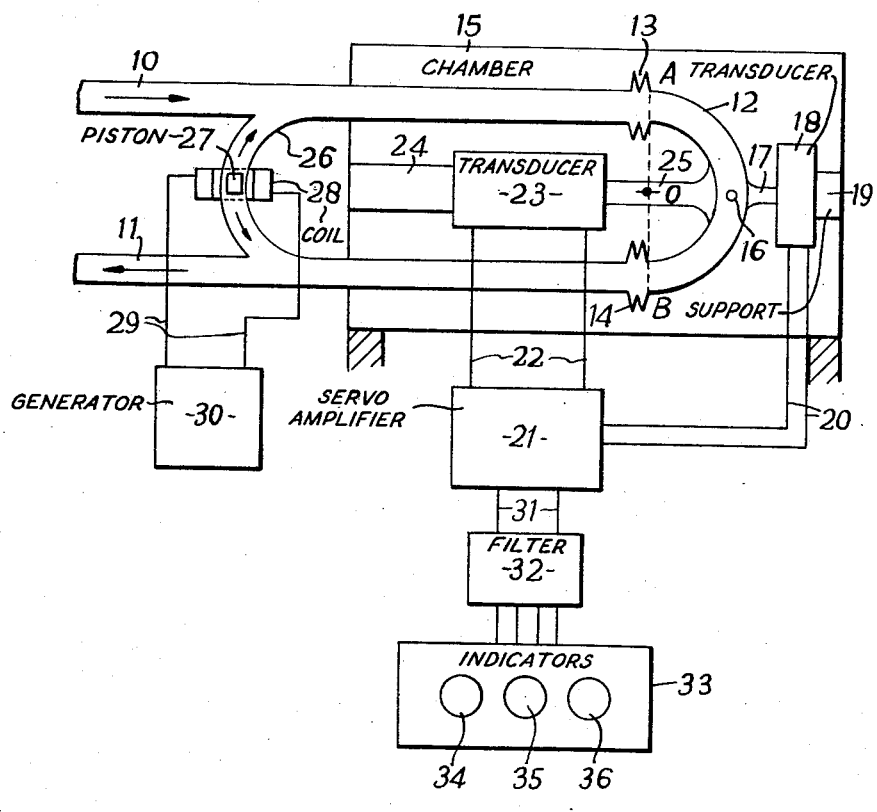

United States Patent Office 3,138,955
Patented June 30, 1964

3,138,955
FLUID MEASURING APPARATUS
Albert Maurel Uttley, Teddington, England, assignor to National Research Development Corporation, London, England, a British corporation
Filed May 8, 1961, Ser. No. 108,500
Claims priority, application Great Britain May 12, 1960
4 Claims. (Cl. 73—228)

The present invention relates to measurements on a fluid flowing in a pipe and is more particularly concerned with arrangements for effecting measurements which will permit indication of the volume flow and also the mass flow of a liquid or gas within a pipe. The same equipment can also readily be made suitable for measuring the density of the fluid.

The invention is based on the physical principle that when a fluid is flowing through a pipe having a section in which there is a change of flow direction, there is a change of momentum which gives rise to a force exerted on that pipe section. Accordingly if the pipe section is free to move it is possible to arrange for the force to be measured and used to indicate flow. In practice it is found most convenient for the pipe section to be made of U-shape so that the direction of flow of the fluid is completely reversed, as this gives a satisfactory balanced arrangement permitting a convenient construction.

According to one feature of the invention, in a fluid flow measuring device, the fluid is caused to flow through a movable section of pipe whereby its direction of flow is altered, the force exerted on the movable pipe section being measured and serving as an indication of the rate of flow.

According to another feature of the invention, in a fluid flow measuring device, the fluid is caused to flow through a U-shaped movable section of pipe whereby its direction of flow is reversed, the pipe section being maintained in position by an electrical servo-mechanism the power to operate which is shown on an electrical measuring instrument which thus serves to indicate the rate of flow.

Elimination of the hydrostatic forces acting upon the movable section may be effected by enclosing the section in a sealed chamber connected by way of a small leak passage to the interior of pipe section, the chamber being completely filled with the same fluid as that flowing in the pipe.

If an oscillatory flow component of known and constant amplitude is superimposed upon the uni-directional flow of fluid through said movable section, the resultant forces exerted upon the latter include oscillatory components at the fundamental and at the second harmonic of the imposed oscillation frequency and these may be detected and used to provide respectively a measure of the mass flow and the density of the fluid.

The invention will be better understood from the following description of one method of carrying it into effect which should be taken in conjunction with the accompanying drawing. This shows diagrammatically the principle of operation of the arrangement according to the invention.

Referring now to the drawing, 10 denotes the inlet pipe for the fluid and 11 the outlet pipe disposed in parallel relationship thereto, the ends of the two pipes being interconnected by a semi-circular or U-shaped section 12 so that fluid flow takes place in the direction indicated by the arrows. The pipes 10 and 11 are connected to the movable section 12 through the intermediary of the bellows 13 and 14 or equivalent coupling means of high compliance, whereby the section 12 is free to perform limited movement backward and forward in a direction parallel with the pipes 10 and 11. The curved pipe section 12, the coupling bellows 13 and 14 and the adjacent ends of the pipes 10 and 11 are disposed within a sealed chamber 15 which is filled with the same fluid as that traversing the pipes 10 and 11. The interior of the pipe system is in communication with the chamber by means of a small leak aperture 16 located centrally in the movable section 12.

The movable pipe section 12 carries a projection 17 which engages an electrical transducer 18 which is mounted on the wall of the chamber 15 by means of a support 19. The output of the transducer due to movement of the pipe section 12 is fed by way of leads 20 to the input of a servo-amplifier 21, the output from which is connected by way of leads 22 to an electromechanical transducer 23 mounted on the opposite wall of the chamber 15 by means of a support 24. The mechanical output of the transducer 23 is coupled by way of the rod 25 to the movable pipe section 12 thus producing a servo-system. The transducer 23 may be for example of the moving-iron, moving-coil or magneto-strictive type and is so operated by the output of the amplifier 21 that the pipe section 12 is restored to its original position, the mechanical thrust due to the fluid passing round the U-bend being balanced by the force exerted by the transducer 23.

The inlet and outlet pipes 10 and 11 are interconnected, preferably at a position adjacent to but outside the chamber 15, by means of a bypass connection 26, preferably curved to a U-shape as shown, containing a vibratable piston or like member 27. This piston may comprise a permanent magnet and is disposed within the field set up by a coil winding 28 embracing the pipe section 26. The coil winding is arranged to be supplied with alternating current of fixed frequency $f$ and constant amplitude by way of leads 29 from an oscillation generator 30. Accordingly when the coil 28 is energised from the generator 30, a vibratory component of frequency $f$ is superimposed on the main fluid flow through the pipes 10, 11 and 12.

The signal output from the amplifier 21 is also extended by way of leads 31 to the filter equipment 32 which includes means for separating out the steady signal component, the component of frequency $f$ and the component of the second harmonic frequency $2f$. These outputs are applied to the indicating panel 33 where they may serve to operate separate indicating instruments 34, 35 and 36.

The force exerted on the movable section of pipe 12 is approximately proportional to the square of the mean velocity of the fluid, so that for pipes of constant cross section it represents a measure of volume flow and the instrument 34 may be calibrated accordingly by experiment. This will be appreciated from the following considerations. If the resultant instantaneous velocity in pipe 12 is:

$$V = v + v_1 \sin 2\pi f t.$$

where $v$ is the mean velocity and $v_1$ the maximum velocity produced by the oscillation generator then since the force F on pipe 12 is proportional to $\rho V^2$, where $\rho$ is the density, F varies as:

$$\rho(v^2 + 2vv_1 \sin 2\pi f t. + v_1^2 \sin^2 2\pi f t.)$$

The term $v_1^2 \sin^2 2\pi f t.$ can be expressed in known manner as a function of $\cos 4\pi f t.$ Accordingly the D.C. component of force varies as $\rho v^2$. Similarly the fundamental component of the vibratory force varies as $\rho v$ and the second harmonic component varies as $\rho$ since $v_1$ and $f$ are assumed to be constant. Hence the fundamental component of the oscillatory movement is approximately proportional to mass flow while the second harmonic of this oscillatory movement is proportional to density. Accordingly the instruments 35 and 36 may be calibrated with substantially linear scales to show mass flow and density respectively. Even if velocity and density are both varying, instantaneous mass flow and density may be derived from three simultaneous observations of D.C., fundamental and second harmonic components of force as indicated on the meters 34, 35 and 36.

It can be shown that the forces exerted upon the movable pipe section 12 by the skin friction of the fluid flow give rise to a force which acts in a direction parallel to the direction AB. It can also be shown that the forces due to the pressure of the fluid within the pipe section gives rise to a resultant force acting in the direction from A to B through O. Since the movable pipe section is mounted so as to move only in a direction at right angles to AB, the transducer 18 is insensitive to either of the unwanted forces.

The velocity distribution over the cross section of the movable pipe section 12 will not be uniform but this is not important so long as it is possible to keep the velocity distribution largely independent of the fluid velocity and thus permit determination of the relationship between the force upon the movable section and the mass flow. Such independence may be achieved by known means such as the provision of honeycomb structures in the pipe.

The movable section 12 of the pipe may theoretically be completely separate from the adjacent pipes 10 and 11 provided the gaps in positions A and B are made equal and held constant. However, any inequality in the size of the gaps leads to the exertion upon the movable pipe section of a force in the same direction as the dynamic force to be measured and for this reason it is desirable in practice that the bellows 13 and 14 should be employed.

I claim:

1. A fluid flow measuring device comprising in combination, an inlet pipe, an outlet pipe substantially parallel to said inlet pipe, a U-shaped movable section of pipe connecting the ends of said inlet and outlet pipes, means for superimposing oscillations of a predetermined frequency and amplitude on fluid flowing through said inlet and outlet pipes, a first electro-mechanical transducer operated by movement of said movable section of pipe, an amplifier connected to said first transducer, a second electro-mechanical transducer operated by the output from said amplifier and connected to said movable section of pipe so as to tend to move it in the opposite direction to the movement produced by fluid flow through said pipes, a filter circuit fed from the output of said amplifier so as to pass only current of said predetermined frequency, and a measuring device selectively responsive to the amplitude of said current of predetermined frequency whereby the rate of flow of fluid through said pipes is indicated on a linear scale.

2. A fluid flow measuring device comprising in combination, an inlet pipe, an outlet pipe substantially parallel to said inlet pipe, a U-shaped movable section of pipe connecting the ends of said inlet and outlet pipes, a bypass channel connecting said inlet and outlet pipes, a mechanical oscillation generator located in said bypass channel and operable to superimpose oscillations of a predetermined frequency and amplitude on fluid flowing through said inlet and outlet pipes, a first electro-mechanical transducer operated by movement of said movable section of pipe, an amplifier connected to said first transducer, a second electro-mechanical transducer operated by the output from said amplifier and connected to said movable section of pipe so as to tend to move it in the opposite direction to the movement produced by fluid flow through said pipes, a filter circuit fed from the output of said amplifier so as to pass only current of said predetermined frequency, and a measuring device selectively responsive to the amplitude of said current of predetermined frequency whereby the rate of flow of a fluid through said pipes is indicated on a linear scale.

3. A fluid flow measuring device comprising in combination, an inlet pipe, an outlet pipe substantially parallel to said inlet pipe, a U-shaped movable section of pipe connecting the ends of said inlet and outlet pipes, a bypass channel connecting said inlet and outlet pipes, a mechanical oscillation generator located in said bypass channel and operable to superimpose oscillations of a predetermined frequency and amplitude on fluid flowing through said inlet and outlet pipes, a first electromechanical transducer operated by movement of said movable section of pipe, an amplifier connected to said first transducer, a second electro-mechanical transducer operated by the output from said amplifier and connected to said movable section of pipe so as to tend to move it in the opposite direction to the movement produced by fluid flow through said pipes, a filter circuit fed from the output of said amplifier so as to produce separate outputs corresponding to direct current, current of said predetermined frequency, a first measuring device responsive to said direct current output so as to give an indication of volume flow, a second measuring device responsive to the current of said predetermined frequency so as to give an indication of mass flow and a third measuring device responsive to the current of twice said predetermined frequency so as to give an indication of density of a fluid flowing through said pipes.

4. A fluid flow measuring device comprising in combination, an inlet pipe, an outlet pipe substantially parallel to said inlet pipe, a U-shaped movable section of pipe connecting the ends of said inlet and outlet pipes, a bypass channel connecting said inlet and outlet pipes, a piston of magnetic material located in said bypass channel, a coil embracing said piston, means for supplying said coil with alternating current whereby said piston is operated to superimpose oscillations of a predetermined frequency on fluid flowing through said inlet and outlet pipes, a first electro-mechanical transducer operated by movement of said movable section of pipe, an amplifier connected to said first transducer, a second electromechanical transducer operated by the output from said amplifier and connected to said movable section of pipe so as to tend to move it in the opposite direction to the movement produced by fluid flow through said pipes, a filter circuit fed from the output of said amplifier so as to produce separate outputs corresponding to direct current, current of said predetermined frequency and current of twice said predetermined frequency, a first measuring device responsive to said direct current output so as to give an indication of volume flow, a second measuring device responsive to the current of said predetermined frequency so as to give an indication of mass flow and a third indicating device responsive to the current of twice said predetermined frequency so as to give an indication of density of a liquid flowing through said pipes.

References Cited in the file of this patent

UNITED STATES PATENTS

| | | |
|---|---|---|
| Re. 24,267 | Ostermann et al. | Jan. 22, 1957 |
| 2,605,638 | Pearson | Aug. 5, 1952 |
| 2,804,771 | Brown | Sept. 3, 1957 |
| 2,989,866 | Widell et al. | June 27, 1961 |